(12) United States Patent
Turpin et al.

(10) Patent No.: US 11,537,835 B2
(45) Date of Patent: Dec. 27, 2022

(54) SMART BADGE SYSTEM AND METHOD

(71) Applicant: PK Solutions, LLC, Augusta, KS (US)

(72) Inventors: Kevin Turpin, Augusta, KS (US); Benjamin Burrus, Wichita, KS (US)

(73) Assignee: Weavix, Inc., Wichita, KS (US)

( * ) Notice: Subject to any disclaimer, the term of this patent is extended or adjusted under 35 U.S.C. 154(b) by 174 days.

(21) Appl. No.: 16/881,858

(22) Filed: May 22, 2020

(65) Prior Publication Data

US 2020/0372316 A1     Nov. 26, 2020

Related U.S. Application Data

(60) Provisional application No. 62/851,158, filed on May 22, 2019.

(51) Int. Cl.
| | | |
|---|---|---|
| *G06K 19/077* | (2006.01) | |
| *H04W 4/029* | (2018.01) | |
| *G06K 19/07* | (2006.01) | |

(52) U.S. Cl.
CPC ... *G06K 19/07762* (2013.01); *G06K 19/0717* (2013.01); *G06K 19/0718* (2013.01); *G06K 19/0724* (2013.01); *H04W 4/029* (2018.02)

(58) Field of Classification Search
CPC .......... G06K 19/0724; G06K 19/0718; G06K 19/0717; G06K 19/07762; H04W 4/029
See application file for complete search history.

(56) References Cited

U.S. PATENT DOCUMENTS

| | | | |
|---|---|---|---|
| 9,129,230 | B2 | 9/2015 | Lewis |
| 10,015,802 | B2 | 7/2018 | Matischek et al. |
| 2013/0048720 | A1* | 2/2013 | Lewis ................ G07C 9/253 235/382 |
| 2016/0044651 | A1* | 2/2016 | Lu ..................... H04W 4/70 370/329 |
| 2017/0023509 | A1* | 1/2017 | Kim .................. G01N 33/0075 |
| 2017/0124842 | A1* | 5/2017 | Sinha ................. A61M 5/1723 |
| 2018/0077546 | A1* | 3/2018 | Arunachalam ........ G08B 21/22 |
| 2018/0313695 | A1* | 11/2018 | Shim .................... G01J 5/0275 |
| 2018/0336478 | A1* | 11/2018 | Bostick .................. H04L 67/52 |
| 2020/0178250 | A1 | 6/2020 | Freed et al. |
| 2021/0195484 | A1* | 6/2021 | Khawer ............... H04W 36/06 |

FOREIGN PATENT DOCUMENTS

WO        2018183789 A1     10/2018

OTHER PUBLICATIONS

International Search Report and Written Opinion from corresponding International Appl. No. PCT/US2019/064306, dated Feb. 27, 2020.

* cited by examiner

*Primary Examiner* — Thomas D Alunkal

(74) *Attorney, Agent, or Firm* — Avek IP, LLC

(57) ABSTRACT

Disclosed is a smart badge device that can be included into a private LTE network established in a facility. The device includes position tracking and estimating capabilities, and operates along with a cloud-based service suite. The cloud services act as a platform between the device and a number of facility software systems. The device also operates with internal and external equipment so that an administrator can track employees and establish data flow between the badge and the facility software systems.

32 Claims, 9 Drawing Sheets

SMART BADGE SYSTEM AND METHOD

CROSS-REFERENCE TO RELATED APPLICATIONS

This application claims the benefit of U.S. Provisional Patent Application No. 62/851,158 filed on May 22, 2019, the entire contents of which are herein incorporated by reference.

BACKGROUND

1. Field

Embodiments of this disclosure relate generally to the field of electronic monitoring devices, and more specifically to mobile monitoring devices for use in cooperation with workers operating in and around facility-related systems.

2. Description of the Related Art

Systems exist wherein facilities incorporate monitoring systems and devices for and in particular to monitoring systems for use in the monitoring of workers operating in particular environments, sometimes where inspections or other relevant tasks are performed.

Currently, workers at a facility are typically given an RFID badge for clocking in and out using a reader at a gate or other entryway. Sometimes readers are present at particular locations in the facility such that workers can be identified at a particular location (using a reader at that point). These badges are a form of identification ensuring that only authorized persons gain access.

The workers typically communicate using company or personally owned smart phones, tablets, or portable computers. Where an employee is in an environment in which they are potentially exposed to dangerous gases, they may be equipped with a mobile gas analyzer. These devices indicate dangerous gases if they are present. If there is an emergency, a worker may use a personal or company phone or other device to alert others.

For many kinds of facilities, safety inspections are required. The inspections are typically required periodically, and it is important that the inspectors executing them not only indicate completion of a list of required tasks, but also that facility managers and others are able to confirm that the required tasks have actually been completed.

In terms of networking, it is known for a facility to utilize Wi-Fi systems for enabling employees to be connected to the internet. Further, employees often utilize cellular service through a service provider.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

A system for monitoring workers or employees is disclosed. In an embodiment, the system includes a wearable device. The wearable device, in embodiments, includes: (i) a controller having a non-transitory memory for storing software and a processor for executing instructions of the software; (ii) a first wireless communication component capable of wirelessly connecting the controller with a cloud-based service acting as a platform between the wearable device and at least one software system utilized by the organization; (iii) a display screen for displaying images and text stored in the memory; (iv) a user-input device for receiving input and transmitting the input to the controller; (v) a position tracking device for continuously tracking a location of the wearable device; and (vi) a battery for providing electrical power to the controller, the wireless communication device, the display screen, the user-input device, and the position tracking device. In embodiments, the controller is configured to: (i) continuously monitor location data received from the position tracking device; (ii) store the location data either locally or remotely; (ii) interface through a hub with a plurality of facility-related software systems; and (iii) communicate the location data to at least one software system utilized by the organization for a business-related objective.

In embodiments, the cloud-based service acts as a platform between the wearable device and at least one software system utilized by the organization. The cloud-based service can enable communications between the controller and a plurality of software systems utilized by the organization. The plurality of software systems utilized by the organization, in embodiments, can include at least two of a scheduling system, a field data management system, a risk based inspection system, and a human resources software system.

In embodiments, the position tracking component utilizes GNSS, and GPS in some instances. The wearable device can also include a position estimating component, the controller using reading received from the position estimating component to estimate real-time locations between position readings received from the position tracking component. In embodiments, the position estimating component is a dead-reckoning device. The wearable device can also include a barometer, where the controller receives readings from the barometer to contribute to a height determination for the wearable device.

In terms of the wireless communication component, it can be configured for use in a private LTE network. More specifically it can be configured to operate on bands in the range of from 700 MHz up to 2.7 GHz, and also operate in either TDD or FDD in a broad sense. The wireless communication component can be configured for use in either a 4G or 5G network. In more specific embodiments, the wireless communication component is configured to operate in a Band 48 CBRS private network in the range from 3550 MHz to 3700 MHz, and in embodiments, uses TDD as a duplex mode.

The system the wearable device is incorporated into can be a wireless network established using an edge router connected into one of a backhaul or a satellite source of internet. In embodiments, the edge router is a Band 48 edge kit. In embodiments, the edge router communicates through at least one MBO antenna. In embodiments, the edge router is located on a vehicle.

The controller can also communicate with external devices through BlueTooth. For example, the controller can be configured to receive readings from a gas sensor which can be utilized by the at least one software system utilized by the organization. Additionally, the controller can be configured to receive readings from a biometric sensor which can be utilized by the at least one software system utilized by the organization.

The wearable device can include front and back cameras and at least one microphone. And in embodiments, the device can have a distinctive coloring making the device identifiable as a device owned or operated by an organization, e.g., that exists about the edges of the device. The device can also include a second wireless network component operated in a LPWAN. In embodiments, the LPWAN is a LoRa network.

A power save mode is also disclosed. In this mode, the controller can, in embodiments, be configured to enter the wearable device into a power save mode by shutting down: (i) the first wireless network component, (ii) a display, and (iii) a plurality of other power-consuming devices upon a detection of a power level dropping below a predetermined minimum; and then maintaining operation of the second wireless network component.

The power level can be monitored to determine whether the predetermined minimum has been reached, and the processor can be configured to operate on a primary mode of wireless networking when a battery level is still above the predetermined minimum, but turned off when the battery level drops below the level (or upon a detection that the battery level is below the predetermined minimum). When the primary networking mode is turned off, a low power mode involves either turning on, or maintaining the operation of a LPWAN upon a detection that the battery level has either reached or is below the predetermined minimum.

Additionally, other additional power-consuming components on the device can also be turned off when the predetermined battery level is reached, or when the battery level is below the predetermined minimum. This might include a display and other locally-functioning equipment on the device as the additional power-consuming components on the device that are turned off when the predetermined battery level is reached, or upon a detection that the battery level is below the predetermined minimum.

Critical components, e.g., a GNSS system on the device, and limiting communications to only occurring through the LPWAN when the predetermined battery level is reached, or upon a detection that the battery level is below the predetermined minimum.

In another embodiment, a system is disclosed for tracking workers at a facility. The device has a processing component; a memory component; a position tracking component for continuously tracking a series of locations of the device; a position estimating component for estimating position between the series of locations; a first wireless communication component configured to operate in a private wireless network; configured to operate with at least one external sensor, the processing component configured to transmit information detected by the sensor wirelessly using the first wireless communication component; a cloud-based service acting as a platform between the device and an organization dedicated software system, the service acting as a hub between the device and the software system.

In embodiments, the wireless communication component is configured to operate in a Band 48 CBRS private network in the range from 3550 MHz to 3700 MHz. In other embodiments, the position tracking component utilizes GNSS. The device can include a component configured to operate in a LPWAN, and the processing and memory components are together configured to shut down the first wireless network component as well as a plurality of other power-consuming devices upon a detection of a battery level dropping below a predetermined minimum; and then maintaining operation of the second wireless network component as the sole means of communications.

BRIEF DESCRIPTION OF THE SEVERAL VIEWS OF THE DRAWINGS

Illustrative embodiments of the present disclosure are described in detail below with reference to the attached drawing figures, which are incorporated by reference herein and wherein.

DETAILED DESCRIPTION

Many industries rely on real-time monitoring and tracking of individuals, inventory, and assets such as infrastructure and equipment. A portable device capable of recording and downloading information may be used by a worker for monitoring to help ensure compliance, quality, and safety, among other things. Embodiments of the present disclosure provide a small, lightweight, and low-power smart badge that may be worn or carried by a worker and used to record information critical for monitoring in the field, track the employee for logistical purposes, detect danger, provide alerts, help locate resources, and at the same time provide the wearer with access to network offerings. A wearable smart badge helps ensure user compliance by being present on the worker at all times while working, and being convenient for assisting with operator tasks.

Figure 1:
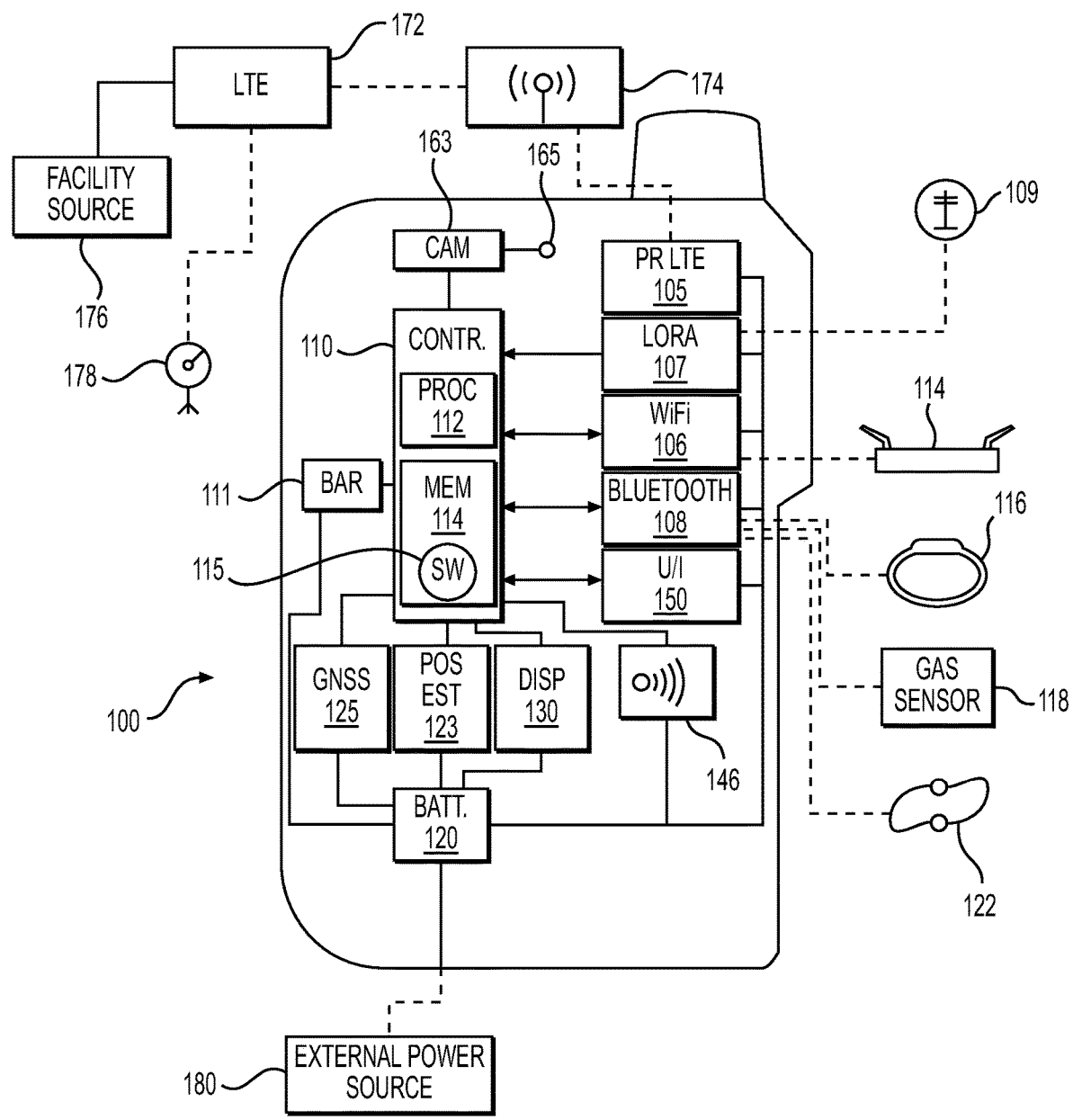
FIG. 1 is a block diagram of a smart badge control and communications architecture, in an embodiment.

FIG. 1 is a block diagram of an exemplary smart badge control and communications architecture. The architecture is incorporated into a portable wireless device 100 for providing functionality. FIGS. 2A-D show different views of an exemplary smart badge physical embodiment 200 which might include the architecture 100 shown in FIG. 1.

Architecture 100 shown in FIG. 1 includes a controller 110 communicatively coupled electronically either directly or indirectly to a variety of wireless communication arrangements, a position estimating component 123 (e.g., a dead-reckoning system which estimates current position using inertia, speed, and intermittent known positions received from a position tracking component 125, which in embodiments, is a Global Navigation Satellite System (GNSS) component, a display screen 130, an optional audio device 140, a user-input device 150, and a dual built-in cameras 165 (another camera, 160, is on the other side of the device). A battery 120 is electrically coupled with a private LTE wireless communication device 105, Wi-Fi subsystem 106, a low-power wide-area network (LPWAN), e.g., LoRa protocol subsystem 107, Bluetooth subsystem 108, barometer 111, position tracking component 125, position estimating component 123, display screen 130, audio device 140, user-input device 150, and built-in camera 160 for providing electrical power. Battery 120 is electrically and communicatively coupled with controller 110 for providing electrical power to controller 110 and enabling controller 110 to determine a status of battery 120 (e.g., a state-of-charge). In certain embodiments, battery 120 is a removable rechargeable battery. A battery-level determination made by the controller 110 will be made in a LPWAN/LoRa utilizing process hereinafter discussed.

Controller 110 is, for example, a computer having a memory 114, including a non-transitory medium for storing software 115, and a processor 112 for executing instructions of software 115. In some embodiments, controller 110 is a microcontroller, a microprocessor, an integrated circuit (IC), or a system-on-a-chip (SoC). Controller 110 includes at least one clock capable of providing time stamps and displaying time via display screen 130. The at least one clock is updatable (e.g., via user interface 150, GPS navigational device 125, Internet 106, private cellular network 107, and server 170).

The wireless communications arrangement includes a cellular subsystem 105, a Wi-Fi subsystem 106, the optional LPWAN/LoRa network subsystem 107 wirelessly connected to a LPWAN network 109, and a Bluetooth subsystem 108, all enabling sending and receiving. Cellular subsystem 105, in a preferred embodiment, enables system 100 to communicate with at least one wireless antenna 174 located at the facility. These antennas could be either permanently installed or temporarily deployed at the facility. In the disclosed embodiment, an LTE edge router arrangement 172 is provided for implementing a common wireless source. LTE edge router arrangements 172 (a/k/a "edge kits") are known in the art, and usable to include a wireless LTE network into the internet. These arrangements also typically are located near a facilities primary internet source 176, e.g., a fiber backhaul or other similar device. Alternatively, the network could be configured to obtain internet from signals from satellite source/transceiver/router 178, especially in a remotely located facility not having a backhaul source, or where a mobile arrangement not requiring a wired connection is desired. More specifically, the satellite source 178 plus edge router arrangement 172 can, in embodiments, be configured into a vehicle, or portable system.

In many instances, however, the system is installed into the backhaul arrangement at the site. This arrangement, however, affords easy set up since the edge kit 172 can directly connected to the existing fiber router, cable router, or any other source of internet at the facility.

In an embodiment, one or more Multi-Band Operation (MBO) antennas 174 are deployed at a location in which the devices, e.g., smart badge 200 etc., are to be used. The MBOs can be omni-directional, directional, or semi-directional depending on the intended coverage area.

Figure 3:
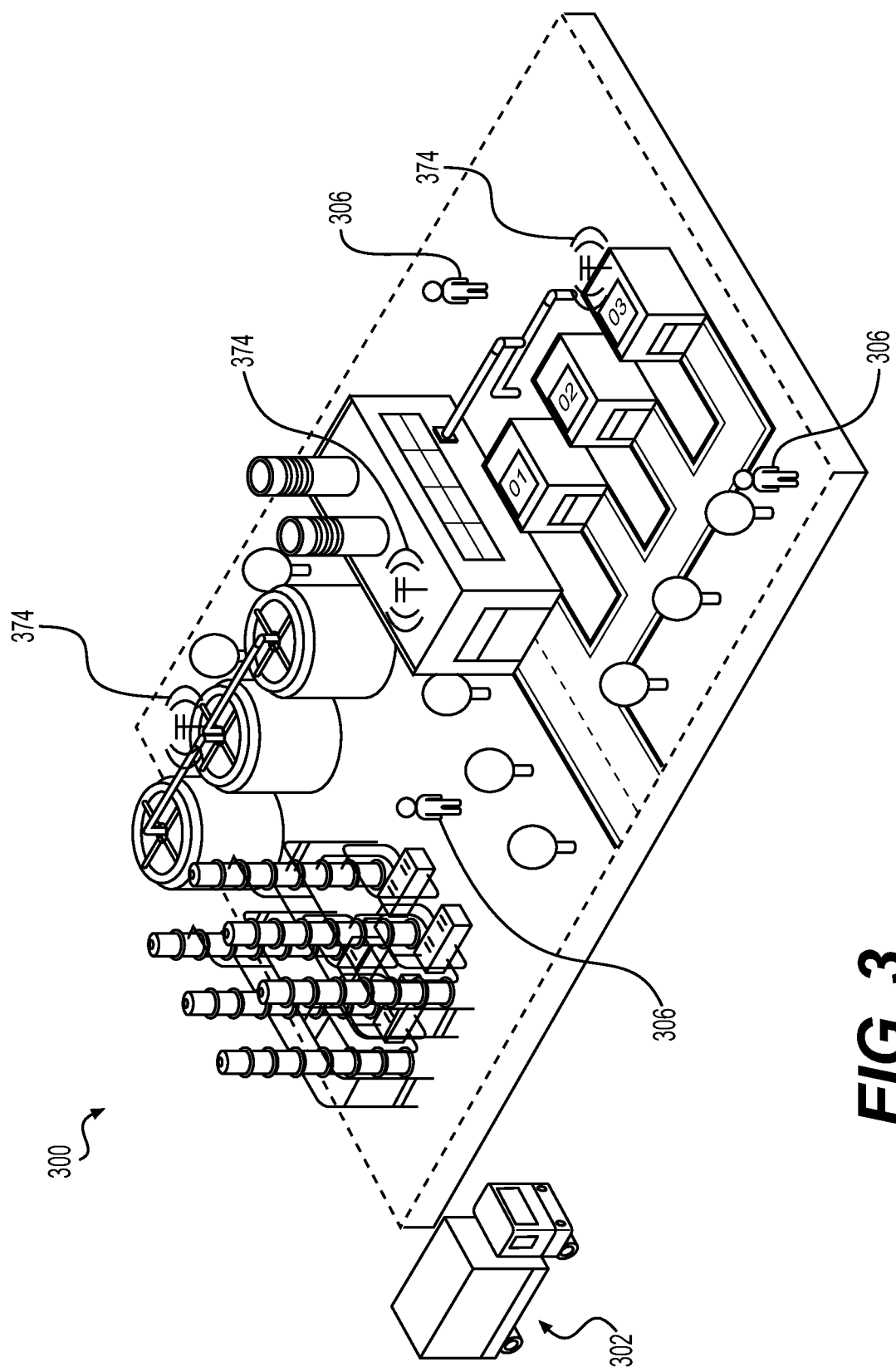
FIG. 3 depicts a representation of an embodiment for a system implementation at a facility.

In FIG. 3, it can be seen that a plurality of MBOs 174 have been installed at various locations throughout the facility. Where the edge kit 172 is located at a location near a facility fiber backhaul, the system might use a plurality of omnidirectional MBOs as shown. Where the internet source is instead, located near an edge of the facility, as is often the case, the system might use one or more directional MBOs such that the coverage is optimal. Alternatively, where the edge kit if in a mobile vehicle, e.g., truck 302, the MBO directional configuration would be picked depending on whether the vehicle would ultimately be located at a central or boundary location.

Collectively, the MBOs, in embodiments, create a private wireless network. In embodiments, the network is a private LTE network (e.g., based on 4G or 5G). In more specific embodiments, the network is a Band 48 Citizen's Broadband Radio Service (CBRS) private network. The frequency range for Band 48 extends from 3550 MHz to 3700 MHz and is executed using Time Division Duplexing (TDD) as the duplex mode.

The private LTE wireless communication device 105 in smart badge architecture 100 is configured to operate in the private network created, e.g., configured to accommodate Band 48 CBRS in the frequency range for Band 48 (again, from 3550 MHz to 3700 MHz) and accommodates TDD. Thus, in the preferred arrangement channels within that range could be used for different sorts of communications between the cloud and the system 100.

In a broad sense, however, the cellular subsystem 105 could be incorporated into a private or public cellular operating on any of the 88 different E-UTRA operating bands (ranging from 700 MHz up to 2.7 GHz), and the duplex mode could be either in TDD, or Frequency Division Duplexing (FDD). To enable CBRS, those skilled in the art will recognize that the controller 110 is representative of numerous cooperating computing and other devices, in addition to those depicted, e.g., multiple processing and memory components relating to signal handling, an optional SIM card, etc. It should also be recognized that the private network component 105 likely also is comprised of numerous components related to supporting the cellular network connectivity, e.g., and antenna arrangement and supporting processing equipment configured to enable CBRS.

The use of CBRS Band 48 (from 3550 MHz to 3700 MHz) in the preferred embodiment provides numerous advantages. For example, it provides long signal ranges, and smoother handovers. It also has the ability to support numerous devices at the same time. Because in embodiments, each of the smart badge devices (and also other forms of smart devices, e.g., smart phones, tablets) have CBRS-enabling architectures, and thus, might be referred to as Citizen's Broadband Radio Service Devices (CBSDs).

In alternative embodiments, the Industrial, Scientific, and Medical (ISM) radio bands could be used instead of CBRS Band 48. The ISM bands have been used in the industrial, scientific and medical fields as an alternative to traditional telecommunications. It should be noted that the particular frequency bands used in executing the processes herein could be different, and that the aspects of what is disclosed herein should not be limited to a particular frequency band unless otherwise specified in the claims (e.g., 4G-LTE or 5G bands could be used).

A Wi-Fi subsystem 106 enables system 100 to communicate with an access point 114 capable of transmitting and receiving data wirelessly in a relatively high-frequency band. Wi-Fi might also be useful in testing the device prior to deployment.

Bluetooth subsystem 108 enables the user to communication with a variety of peripheral devices, including a biometric interface device 116, a gas/chemical detection device 118 used to detect noxious gases. It should be noted, that although shown as Bluetooth connected devices in FIG. 1, the biometric and gas detection devices 116 and 118 could alternatively be integrated into the system 100. It should also be noted that numerous other Bluetooth devices could be incorporated into the system. Although Wi-Fi is enabled, it will not (in embodiments) be utilized in the ordinary operation of each device (e.g., device 200 in FIGS. 2A-D) on location.

As used herein, the wireless systems may be any device capable of simultaneously communicating wirelessly (e.g., via radio waves) with a plurality of other devices (e.g., a plurality of sensors, a remote interface) and optionally with the cloud/internet for accessing websites, databases, etc.

The wireless subsystems 105, 106, and 108 are each configured to transmit/receive data in a proper format, e.g., in IEEE 802.11, 802.15, 802.16 Wi-Fi standards, Bluetooth standard, WinnForum SAS test specification (WINNF-TS-0065), and across a desired range. The operator may connect multiple devices with system 100 to provide data connectivity and data sharing across the multiple devices. In some embodiments, the shared connectivity may be used to establish a mesh network.

The location tracking and position estimating systems 125 and 123 can operate cooperatively. The location tracking system 125, again, can be a GNSS (e.g., GPS) navigational device 125 receives information from satellites and determines a geographical position based on the received information. The position estimating system location device 125 is used to track the location of smart badge incorporating architecture 100. In certain embodiments, a geographic position is determined at regular intervals (e.g., every five seconds) and position in between readings is estimated using the estimating system 123.

GPS position data is stored in memory 114 and uploaded to server 170 at regular intervals (e.g., every minute). In some embodiments, the intervals for recording and uploading GPS data are configurable. For example, if smart badge 200 is stationary for a predetermined duration, the intervals are ignored or extended, and new location information is not stored or uploaded. If no connectivity exists for wirelessly communicating with server 170, location data is stored in memory 114 until connectivity is restored at which time the data is uploaded, then deleted from memory 114. GPS data may be used to determine latitude, longitude, altitude, speed, heading, and Greenwich-mean time (GMT), for example, based on instructions of software 115 or based on external software (e.g., in connection with server 170). In certain embodiments, position information may be used to monitor worker efficiency, overtime, compliance, and safety, as well as to verify time records and adherence to company policies.

As an alternative to the locating and estimating tracking process discussed above using dead reckoning system 123 in combination with GNSS system component 125, a Bluetooth tracking arrangement using beacons might be used instead. For example, Bluetooth component 108 could receiving signals from Bluetooth Low Energy (BLE) beacons. The BLEs could be strategically located about the facility (see FIG. 3) and the controller 110 be programmed to execute relational distancing software using beacon signals (e.g., triangulating between beacon distance information) to determine device position. Regardless of the process, component 108 detects the beacon signals and the controller calculates roughly the distances used in estimating location.

Another alternative locating arrangement with the badge 200 is the use of Ultra Wideband (UWB) with spaced apart beacons. The beacons are small battery powered sensors that are spaced apart in the facility and broadcast a signals that can be received by a UWB component included in the badge. Once equipped with the devices, the worker's position can be monitored throughout the area over time.

Whereas the location sensing GNSS and estimating systems 125 and 123 can be used to primarily determine a horizontal location, the barometer component 111, in embodiments, can be used to determine a height (or cooperate with GNSS to determine a height) using known vertical barometric pressures at the facility. With the addition to a sensed height, a full three-dimensional location can be determined by the processor 112. This is useful in determining if a worker is, e.g., on stairs or a ladder, atop or elevated inside a vessel, or in other relevant locations.

An external power source 180 is optionally provided for recharging battery 120. The battery, in embodiments, is made to be receivable into a charging station (not shown). Smart badge architecture 100 may include a connector enabling connecting to the external power source 180. Example power connectors include a universal-serial bus (USB) or firewire port for plugging in to a direct current (DC) power source. In certain embodiments, smart badge system 100 includes a USB Type-C charging port. In some embodiments, rapid recharging is provided (e.g., up to 65% of full battery charge is provided within ten minutes).

FIGS. 2A-D show views of an exemplary smart badge physical embodiment 200. In embodiments, the smart badge 200 uses the control architecture 100 shown in FIG. 1 and includes many of the same elements of FIG. 1. Items enumerated with like numerals are the same or similar and their description may not be repeated accordingly.

Display screen 130, which could, in alternative embodiments, be a touch screen, is for example a liquid-crystal display (LCD), an e-ink display, an organic light-emitting diode (OLED), or other digital display capable of displaying text and images. In some embodiments, display screen 130 uses a low-power display technology, such as an e-ink display, for reduced power consumption. Images displayed using display screen 130 include but are not limited to photographs, video, text, icons, symbols, flow charts, instructions, cues, and warnings. For example, display screen 130 may display (e.g., by default) an identification style photograph of an employee who is wearing smart badge 200 such that the smart badge replaces a traditional badge worn by the employee. In another example, step-by-step instructions for aiding the operator while performing a task are displayed via display screen 130. In some embodiments, display screen 130 may lock after a predetermined duration of inactivity by an operator to prevent accidental activation via user-input device 150 (See FIG. 1; additional description below).

Optional audio device 140 optionally includes at least one microphone (not shown) and a speaker 142 for receiving and transmitting audible sounds, respectively. Although only one speaker 142 is shown existing in architecture image FIG. 1, it should be understood that in the actual physical embodiment, multiple speakers (and also microphones used for the purpose of noise cancellation) are utilized such that the device can adequately receive and transmit audio. In certain embodiments, an operator speaks commands to smart badge 200, in which the microphone receives the spoken sounds and transmits signals representative of the sounds to controller 110 for processing. In some embodiments, audio systems 140 disseminate audible information to the operator via the speakers (not shown) and receives via a microphones (also not shown). Audible information may include instructions, reminders, cues, and/or warnings to the operator and may be in the form of speech, bells, dings, whistles, music and other attention-grabbing noises without departing from the scope hereof. One or more speakers may be adapted to emit sounds from a front side 202 (see FIGS. 2A-B) a back side 204 (see FIG. 2C), any of the other sides of the device, or even multiple sides of smart badge 200.

Figure 2A:
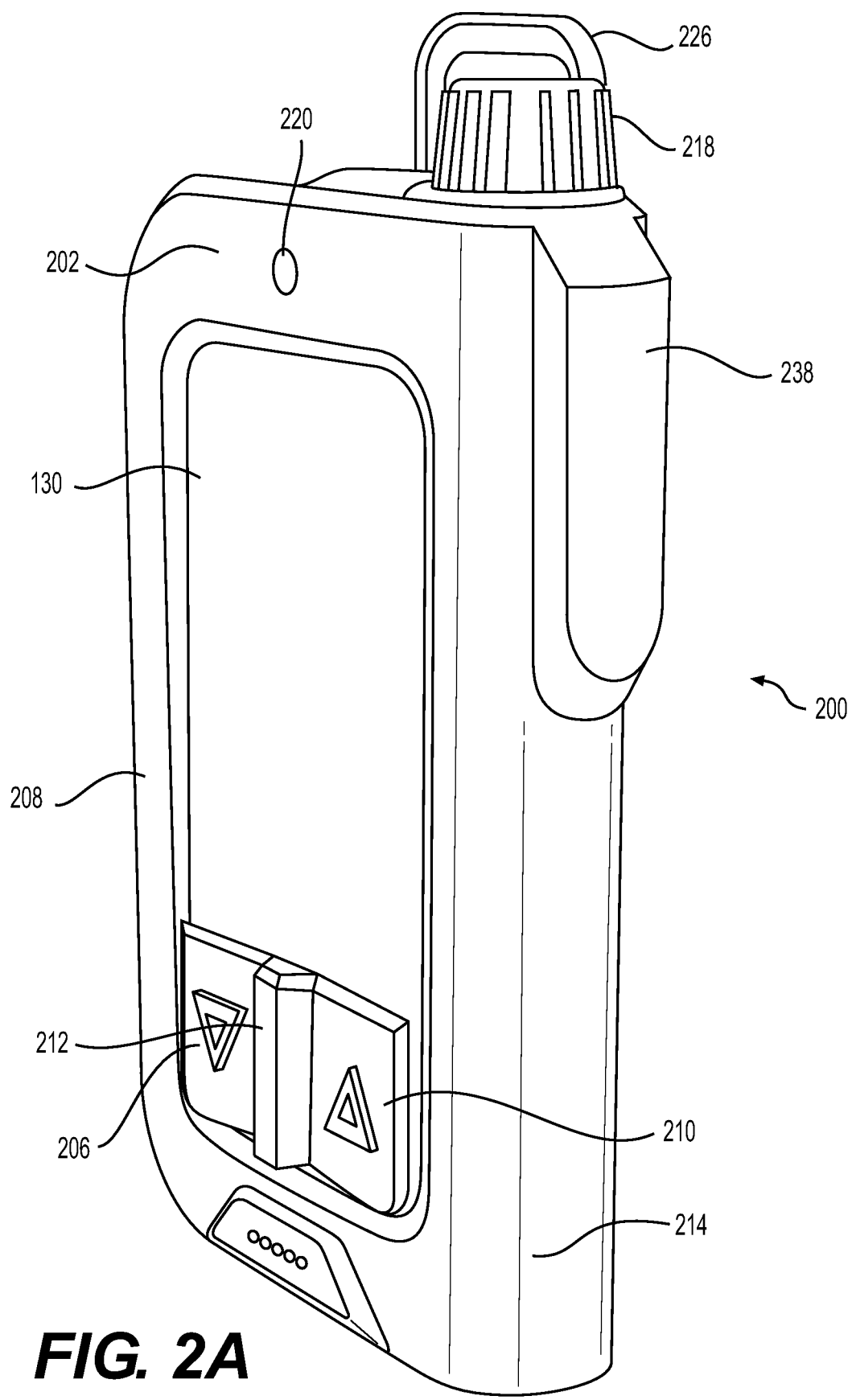
FIG. 2A shows a frontside angled perspective view of a smart badge, in an embodiment.
Figure 2B:
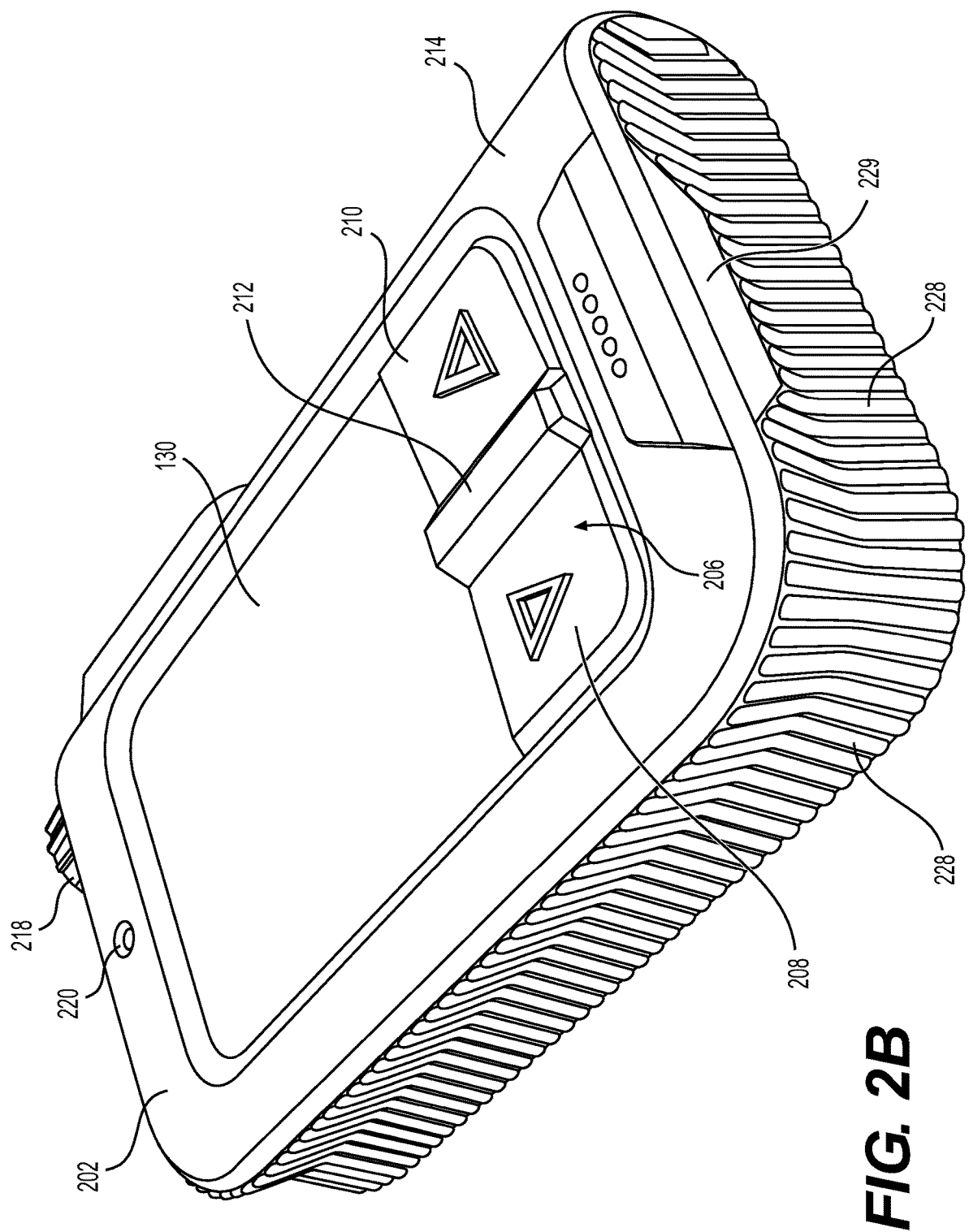
FIG. 2B shows a differently angled frontside perspective view of a smart badge, in an embodiment.

A user-input system 150 (see FIG. 1) is adapted for receiving user inputs and transmitting the user inputs to controller 110. User-input may include any user-input means including but not limited to touch inputs, audible commands, keyboard, etc. In the embodiment of smart badge 200 depicted in FIG. 2, user-input device includes a plurality of navigational tools 206 that may be operated by the finger/thumb of the operator. As depicted in FIGS. 2A-B, the navigational tools include a down and up navigational buttons 208 and 210, a selection button 212, and a back/home button 214. Down and up buttons 208 and 210 enable scrolling up or down through displayed content, and the outwardly extending selection button 212 can be depressed to select menu options. The back/home button 214 enables the user to back out of selected options and ultimately to return to a home screen. However, other handheld devices will use other kinds of arrangements (e.g., a touchscreen, or other buttons) without departing from the scope hereof unless specified in the claims.

In some embodiments, smart badge 200 is powered on at all times assuming a sufficient battery charge. In other words, an option to turn off smart badge 200 may not be available to a standard operator (e.g., an operator without administrator privileges). If battery 120 discharges below a cut-off voltage, such that smart badge 120 loses power and turns off, smart badge 120 will automatically turn on upon recharging of battery 120 to above the cut-off voltage.

In operation, smart badge 200 enters a standby mode when not actively in use to conserve battery charge. Standby mode is determined via controller 110 to provide a low-power mode in which no data transmission occurs and display screen 130 is an off state, yet in standby mode, smart badge 200 is powered on and ready to transmit and receive data. During use, smart badge 200 operates in an operational mode.

Figure 6:
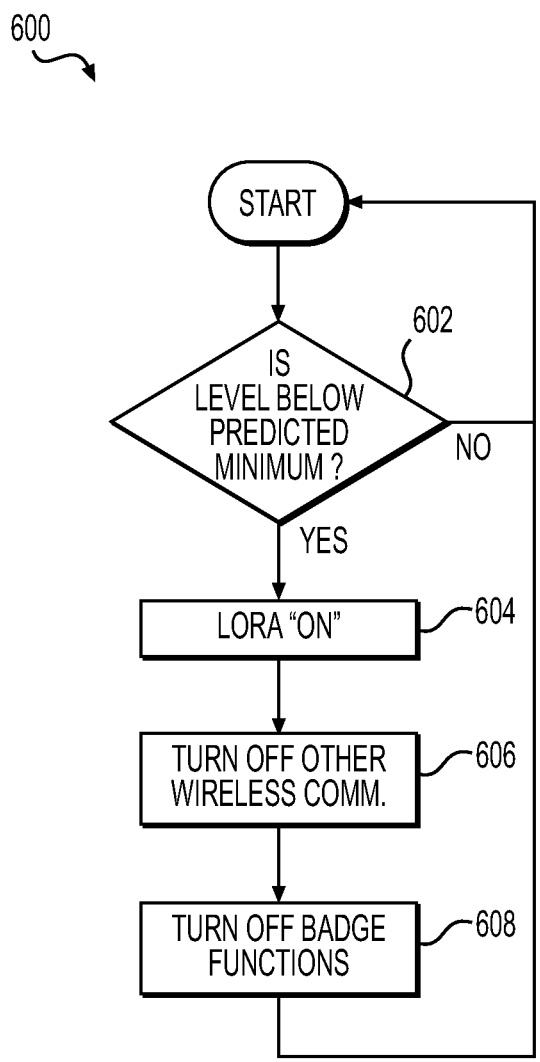
FIG. 6 depicts a power saving process which uses LORA technologies.

This standby mode is utilized in the process shown later in FIG. 6, which also utilized the LoRa network in low-battery situations. Referring to the figure, it can be seen that a process 600 is executed on processor 112 according to software existing on memory component 114. After start, the process moves to a step 602 at which a determination is made as to whether the level in battery 120 has reached a predetermined minimum. E.g., an administrator may determine that at a 15% battery level it is desirable to switch the phone into low power mode. Assuming that is the case, if the battery level is above 15%, the process returns to start, and the device 200 will continue to operate in normal mode as the process loops between start and step 602.

If, however, at some point in step 602 it is detected that the battery level has fallen below the predetermined minimum, the process moves on to step 604 in which the LPWAN/LoRa network subsystem 107 is turned on (or perhaps may be continually left on since it is a low power consumer).

In a next step 606, all of the other wireless forms of communications are shut off, e.g., components 105 (LTE), 106 (WiFi), 108 (BlueTooth), as well as any other wireless communications means not listed on the device. This leaves LPWAN/LoRa as the only wireless connection once the low power mode has been entered into.

In a next step 608, all of the locally-functioning equipment on the phone that significantly drains the battery, e.g., display 130, audio 140, and cameras 160 and 165 are also turned off. This leaves only the critical equipment, e.g., GNSS system 125, optionally position estimator 123, controller 110, and optionally barometer 111, as the only devices active on the phone.

By limiting the communications to only using LoRa, and by limiting power consumption to only the critical device systems (e.g., GNSS 125 and component 123), the power drain is dramatically reduced. Because power consumption is so low, the device is able to communicate locational information (using GNSS 125 and component 123) and other information deemed critical via LoRa for a considerable amount of time.

All of steps 604, 606, and 608 are executed in a loop until step 602 determines that the battery level exceeds the predetermined minimum. It should be noted, that although steps 604, 606, and 608 are shown in FIG. 1 as being executed in series, they could, alternatively, all be executed in parallel.

Figure 2C:
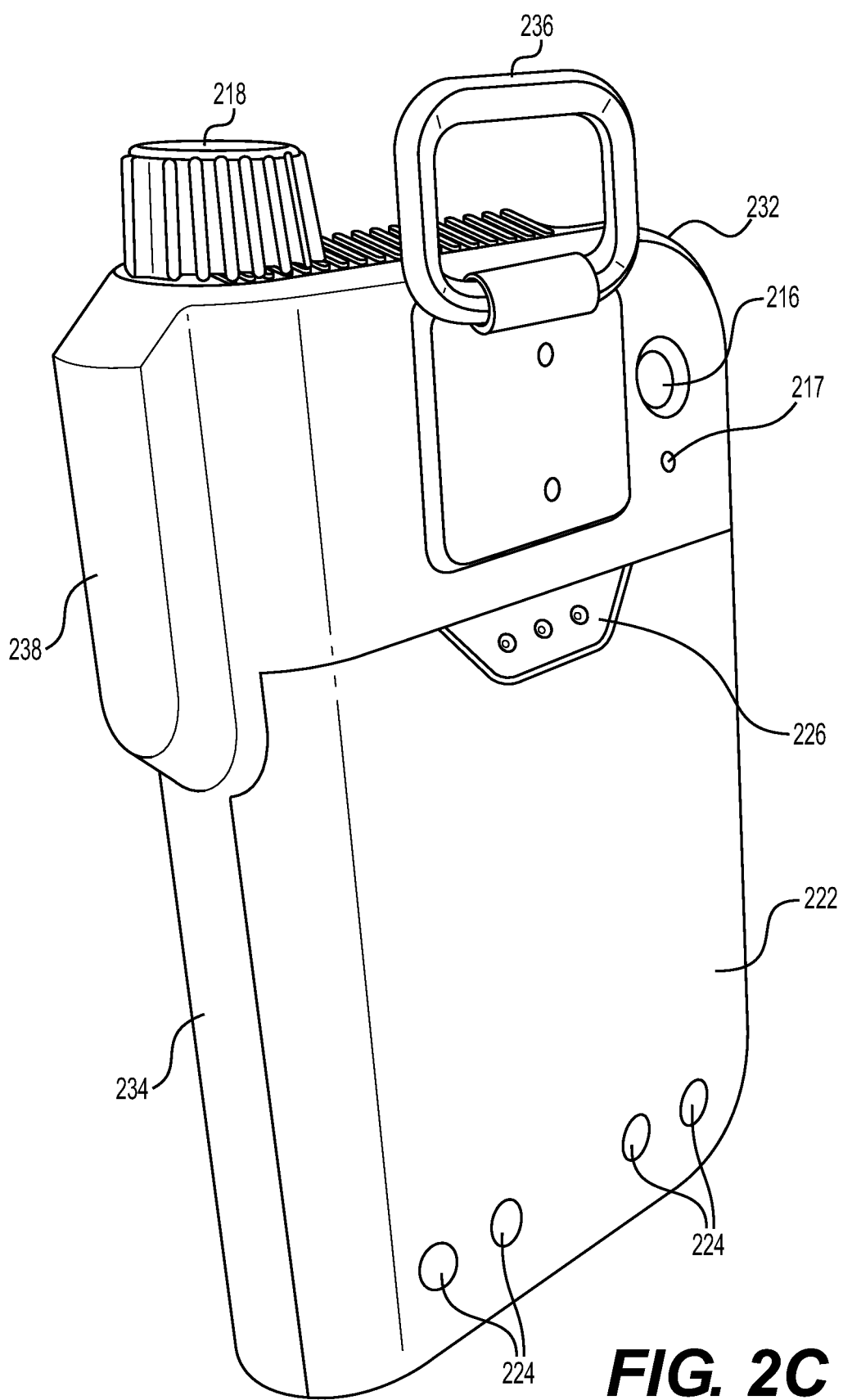
FIG. 2C shows an angled backside perspective of the smart badge, in an embodiment.

FIG. 2C shows a backside view of smart badge 200 where the back built-in camera 216 and LED illuminator 217 are incorporated. This arrangement, along with front camera 220, ensures that imaging is available no matter how the badge is being used. In some embodiments, an additional external camera might be used that is physically separated from smart badge 200 via blue tooth, and that camera may optionally be used in place of built-in cameras 216 and 220 or in addition to the built-in cameras. In this alternative embodiment, the smart badge 200 would be configured to receive pictures taken by the external camera (not shown).

The device 200 can also be configured to receive photos (via Bluetooth) from other kinds of external cameras. These may be a wearable devices such as cameras mounted to glasses or helmets, such that the camera may provide a forward-facing view from the perspective of the operator while being operated hands-free. Alternatively, an external camera may be positioned above a workstation or around another structure to provide an overhead view, inside view of a contained area (e.g., temporarily). The external camera might provide an internal view of the contained area, and can be positioned on a gimbal, swivel plate, rail, tripod, stand, post, and/or pole for enabling movement of the camera. Camera movement may be controlled by the operator, under preprogrammed control via controller 110, FIG. 1, or via another (separate) control mechanism.

In certain embodiments, a plurality of views may be displayed on visualization device 130 from the built-in cameras 216 and 220 (which are represented as one camera 165 in FIG. 1). Selection and enhancement (e.g., scrolling, panning, zooming) of views may be provided via user-input device 150, for example. Built-in cameras 216 and 220 (see FIGS. 2A-D), in embodiments, could be a digital-video cameras or high-definition digital-video cameras. The optional front and back cameras 220 and 216, together enable the receipt of photo or video content from either side of the camera.

Other features of the badge 200 include an easy to grab volume control dial 218 which can be used to, with one hand, increase or decrease the volume of the device as well as a push-to talk button 219. The volume control dial 218 controls the loudness of the device, while the push to talk button 219, when depressed, enables voice transmissions/messages to be sent to other smart badge users or others. Systems in the smart badge 200 controller 110 enable signals from the push-to-talk button 219 and the volume control dial 218 to result in the desired functions.

Figure 2D:
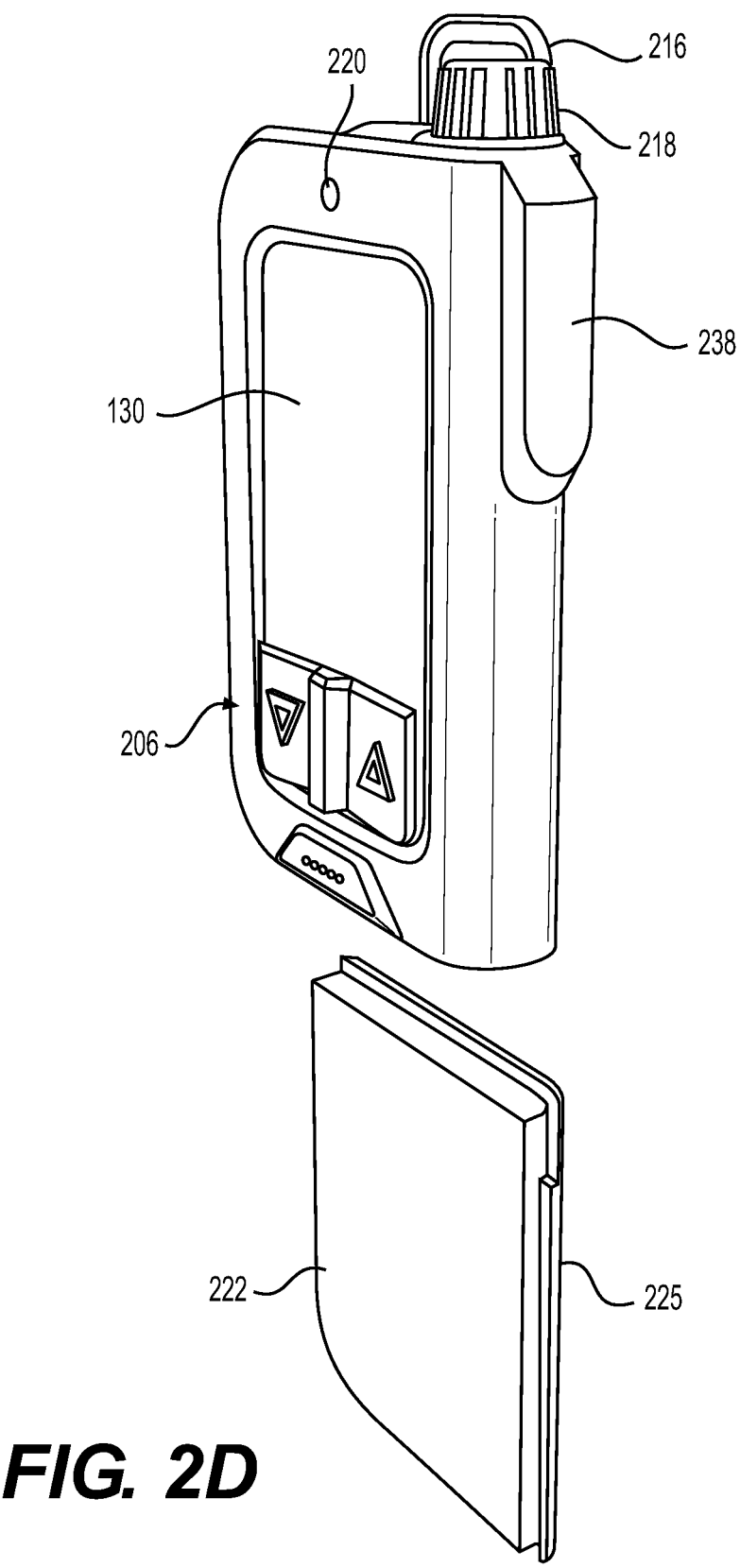
FIG. 2D shows a perspective exploded view of the battery of the smart badge removed, in an embodiment.

In the FIGS. 2A-D embodiment, an embodiment for the battery arrangement 120 shown in FIG. 1 is shown. Referring specifically to FIGS. 2C and 2D, an embodiment for a removable battery 222 is shown. As can be seen, the battery in FIG. 2C, the battery 222 includes charging ports 224 which enable it to be received into a dock charger (not shown). In FIG. 2C, the phone is shown integrated into the body of the device, but it can be slid out downward on track channels 225 upon depressing a release 226, as is available in many devices. Alternatively, the battery 222 could be configured to slide out of and away from the phone laterally given an alternative track arrangement.

It is contemplated that display 202, upon activation, is configured to display a battery level (e.g., a state-of-charge) indication. The indicator is made to be presented due to processes running on controller 110 (e.g., which detect voltage from a volt meter electrically coupled with battery 222 and electronically connected with the controller 110).

Referring to FIG. 2B, ribbed rubberized sides 228 are, in embodiments, provided to enable grip and are, in embodiments, colored differently than the rest of the phone to immediately distinguish the device as associated with an organization. For example, a bright blue might be used for the ribs so that it can readily be identified as a company phone to prevent theft, and to otherwise distinguish the smart badge from other wireless devices. In the disclosed embodiment, the ribs are inwardly angled to form an inward tapered V-shaped trough around a portion of the periphery of the device as shown.

FIG. 2C reveals an attachment system 232 which is removably attached to the back of the device using a screw 234. The attachment system 232 shown is adapted for receipt on a lanyard as is a common means of carrying a badge in the field. Those skilled in the art will recognized, however, that numerous other kinds of attachment arrangements can be utilized with the smart badge. E.g., the attachment mechanism could alternatively be a hinged clip so that the device could be attached to an adornment (e.g., a belt or pocket) for securement to the user. In embodiments, different attachment options (clips, lanyard hoops, or other attachments mechanisms) are made to be removably attachable using screw 234.

Advantages of smart badge 200 include its ease of use for carrying in the field during extended durations due to its small size, relatively low power consumption, and integrated power source. In certain embodiments, smart badge 200 is sized to be small and lightweight enough to be worn at all times by an operator.

FIG. 3 depicts a representation of an embodiment for a system implementation at a facility 300. As can be seen, a plurality of differently and strategically placed MBO antennas 374 (all like the at least one antenna 174 discussed in FIG. 1) are used to receive signals from some sort of internet source, e.g., a fiber backhaul at the facility, or a mobile system, e.g., a truck 302. The truck 302, in embodiments, would include the edge kit 172 in FIG. 1). The strategically placed antennas 374 repeat the signals received and sent from the edge kit 172 such that private LTE is made available to a plurality of workers 306, and with each worker possessing an LTE enabled smart badge 200, all can be continually tracked.

Again, many implementations might instead involve the use of stationary temporary or permanently installed LTE sources (e.g., like kit 172) that obtain network access through a fiber or cable backhaul, and thus, the devices are not mobile. In alternative embodiments, a satellite or other internet source could be embodied into hand-carried or other mobile system, e.g., bag, box or other portable arrangement.

Figure 4:
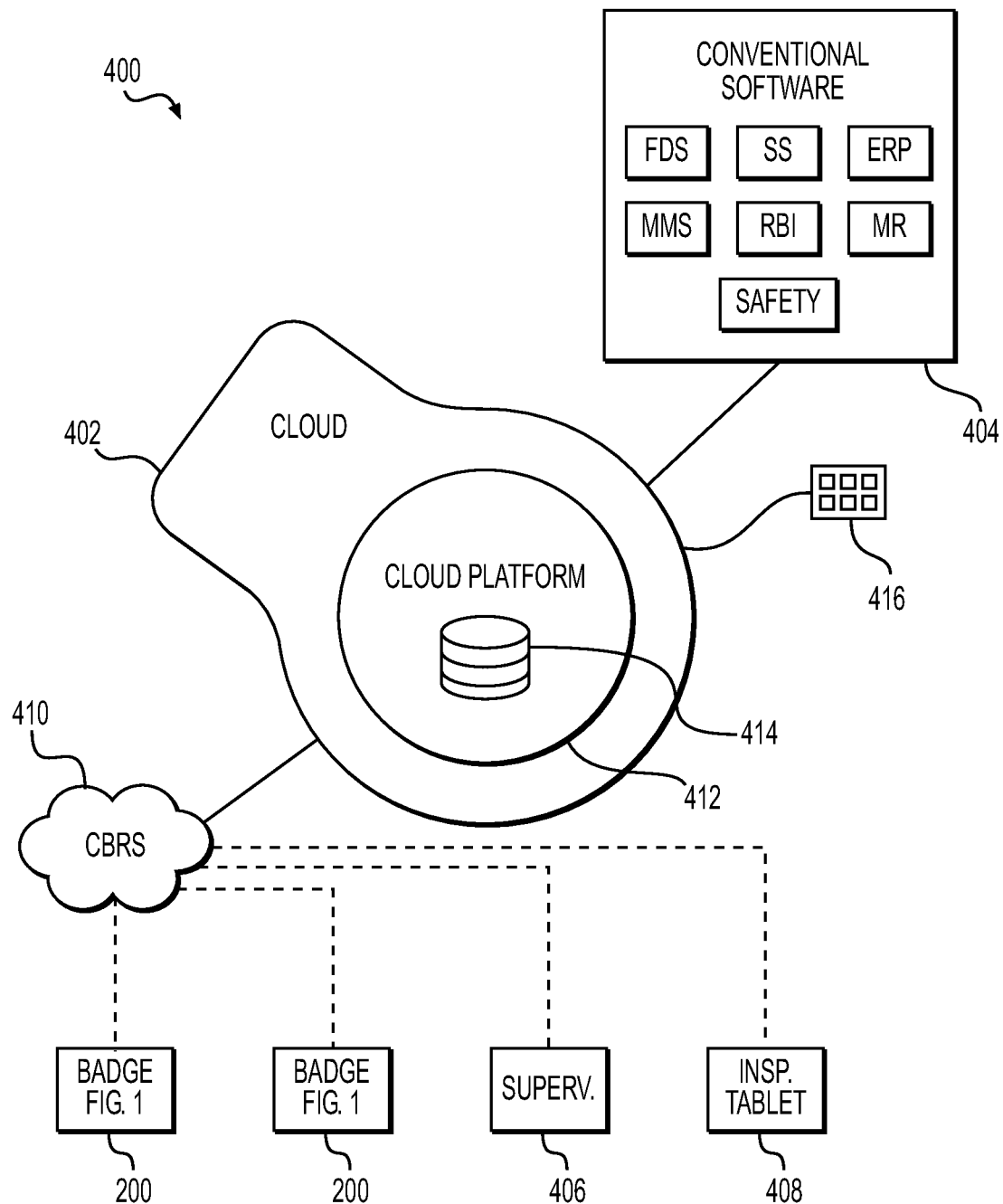
FIG. 4 shows a cloud-based network diagram of an embodiment of the system.

FIG. 4 depicts an exemplary high-level cloud-centered network arrangement 400 otherwise known as a Cloud-Based System. Referring to the figure, it can be seen that the system centers around a cloud network 402. Through the cloud 402, a plurality of conventional software systems are made to be accessible to a plurality of smart-badge devices, as well as more standard devices (e.g., a smart phone 406 as well as a tablet 408) each equipped with a CBRS Band 48 networking or other cellular wireless capabilities. Each of the devices, although diverse, could embody the architecture 100 shown in FIG. 1, but be distributed to different kinds of users. For example, the badges 200 might be worn by employees or independent contracted workers at a facility. CBRS-equipped smart phones 406 might be utilized by an on or off site supervisor. And tablet 408 might be utilized by an inspector or another person wanting to have improved display or other options. Regardless, it should be recognized that numerous devices could be utilized in combination with an established cellular network 410 (e.g., CBRS Band 48 in embodiments) to provide the ability to access the conventional software applications 404 to be accessed by the devices, e.g., badges 200, smart phone 406, and tablet 408.

Also, in FIG. 4, it can be seen that a cloud platform 412 is what executes the functions (which are saved on a database 414) necessary to enable the utilized as a services suite enabling interfacing between the conventional software systems 404 and the devices 200, 406, and 408. The cloud platform 412 is, in embodiments, can be configured by an administrating organization 416 to enable the users of devices 200, 406, and 408 to send and receive data to and from numerous existing facility-related software systems 404. For example, the functionality desired to create the interplay between the smart badges 200 and other devices with the conventional software systems 404 can be configured on the database 414 by an organization interested in monitoring employees, transmitting alerts to these employees based on determinations made by the platform 412, etc. Amazon Web Services (AWS) is a widely used example of this sort of cloud platform, but others could be used instead.

Examples of data to download to smart badge controller 110 include software updates, device configurations (e.g., customized for a specific operator), location save interval, upload data interval, and a web application programming interface (API) server uniform resource locator (URL).

With respect to the conventional software arrangements 404, refineries as well as other facilities utilize extensive software programs for the purpose of daily and long-term business operations. For example, Scheduling Systems (SS), Field Data Management (FDS) systems, and/or Enterprise Resource Planning (ERP) software systems are used to track and plan for the use of facility equipment and other resources. Manufacturing Management System (MMS) software is used to manage the production and logistics processes in manufacturing industries, e.g., for the purpose of reducing waste, improving maintenance processes and timing, etc. Risk Based Inspection (RBI) software assists the facility using an optimizing maintenance business processes to examine equipment and/or structures. RBI, more specifically, can use decision making software processes to make inspection plans more efficient. Further, risk of failure is set at an "acceptable" level, and inspections, repairs, and replacements are used to make sure that risk remains below what is acceptable. See, e.g., U.S. Pat. No. 9,672,486 issued to Turpin, the entire contents of which are herein incorporated by reference.

The facility 416 may utilize Human Resources (HR) software which is responsible for tracking employee time, and can in versions, interact with employee card readers or other devices to track and record when an employee enters a particular facility, or portion of a facility, and at what time each entry occurs. Often the employees each have identifying cards which include an RFID tag, and an RFID transponder is located at each point of access. In order to gain access, the employee scans the badge, is allowed access, and the HR application records the time access was granted. The smart badge can also be used to scan RFID tags at locations, e.g., vessels and equipment.

Ordinarily, in conventional arrangements, each of the facility software applications are accessed one at a time. E.g., a user in a facility may call up the facilities ERP application on a computing device at the facility. Once that task is completed, the user, still on the computer, will open the MIMS software to execute tasks. Then, after that, the user may call up the RBI application. And then the same thing for the HR application. Thus, the software products are called up one after the other.

Figure 5:
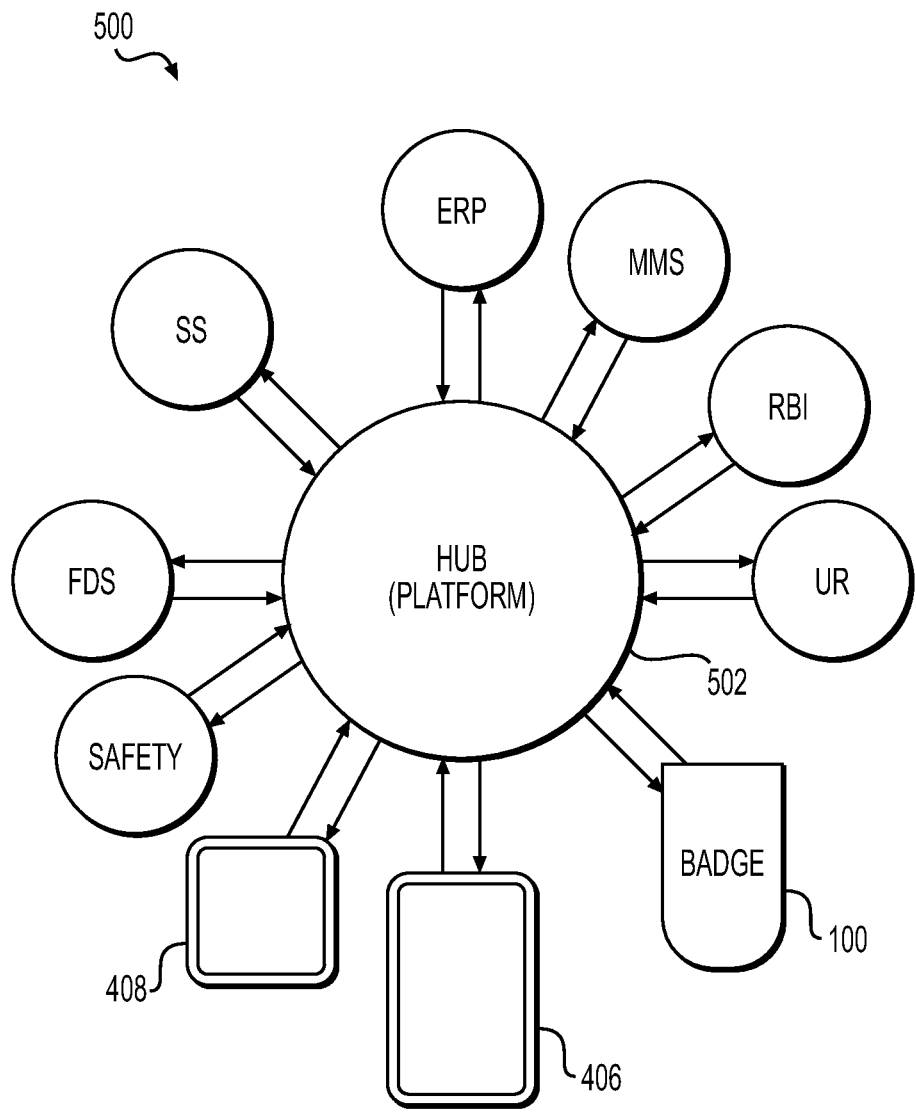
FIG. 5 depicts data-flow process diagram reflecting a hub created for the implementation of embodiments.

Here, the utilization of cloud based platform 412 enables a hub arrangement 500. FIG. 5 depicts an exemplary data-flow process diagram reflecting a platform/hub 502 created for the implementation of embodiments. The FIG. 5 hub data flow disclosed is a cloud-based software hub created to integrate numerous facility computer software applications (e.g., Safety, FDS, SS, ERP, MMS, RBI, HR, or other software systems for a refinery embodiment) for use by the hand-held devices all at once. A user can use the smart badge 200 or any of devices 406 and 408 to access and interface with the hub 502. Since the hub is cloud-based application that is used to interface with the many traditional facility applications, it can send commands and data to and back from each smart badge 200, smart phone 406, or tablet 408.

The smart badge 200 additionally can serve as a substitute to the RFID card system formerly used by the facility HR software system to track employees. The software hub, which is run on a device on a network (e.g., a server) can be used to send or receive information from any of the facility software applications wirelessly.

Again, in the past, a user in the facility would call up any one of the plurality of facility applications independently. Here, however, using the hub, a select number of the facility software systems are able to be accessed and interfaced with by the devices 200, 406, and 408, allowing for the relevant transfer of data back and forth wirelessly given permissions provided by a facility or other administrator. In the reverse, the hub arrangement can be configured to send communications to the devices 200, 406, and 408 based on analysis conducted using the software systems. This enables the user of the smart badge 200, phone 406, and/or tablet 408 to receive warnings, etc., generated as a result of analysis conducted. It also enables the user be tracked in terms of movements.

The badge can track not only the current location of the employee, but also look at the recorded locational information (e.g., of employees 306 at the facility 300 in FIG. 3). Because they are able to interface with the hub, the smart badges 200, phones 406, and tablets 408, have simultaneous access to the diverse applications 404. This enables a locational record to be analyzed to determine how well various workers and other device users are doing in performing various tasks. So, for example, if that employee is inspecting a particular vessel in a refinery, it may be necessary for them to spend an hour doing so. If the locational data record reveals that the inspector was only physically at a vessel for two minutes, this is an indication of hasty or incomplete work.

The tracking can also be used for facility management with an eye towards efficiency. For example, the tracking record for multiple employees from the contractor's building outside the site can reveal patterns in foot traffic. For example, the tracking might reveal that the chosen (rather than presumed) pathway for multiple employees causes them to go back and forth to a location on the site that is long and has to go around many interfering structures. The added distances reduce cost-effectiveness because of where the workers are actually walking.

The tracking might also reveal that one or more workers are passing through dangerous or restricted areas. For example, a facility or other software system 404 might establish geofences around unsafe working areas. This enables the smart badge 200 (or devices 406 or 408) to receive alerts transmitted by the cloud-based hub system. Since the system sees exactly where the employees are at given times, and where they are traveling, certain movable structures within the refinery may be moved so that an optimal layout is configured (e.g., where the hub detects that employees are habitually forced to take longer walk paths in order to get around an obstructing barrier or structure).

The employee-worn smart badge 200 (and possibly other devices including architecture 100) can be used along with the peripherals shown in FIG. 1 to accomplish a variety of objectives. For example, workers can, in embodiments, be equipped with a BlueTooth enabled gas-detection device. These devices detect the existence of a dangerous gas, or gas level, using sensors. By connecting through the smart badge 200, the readings can be analyzed by hub 412 to implement a course of action due to sensed characteristics of toxicity. The hub can then send an alert out to the smart badge 200, and thus the wearer, e.g., using speaker 140 or alternative notification means to alert the wearer so that they can avoid danger.

Furthermore, the biometric device (e.g., incorporating heart rate, moisture sensors, etc.) can, via hub 412, put the badge 100 in communication with a biometrics analysis system operating either on the hub 412, or on one of the already-existing software systems 404 to detect danger indicating biometric conditions of the wearer. Thus, heart rates, dehydration, and other biometric parameters can be monitored and analyzed by the hub system. And warnings can be transmitted to the wearer through the smart badge 200 to a supervisor through device 406, or to anyone else connected with the overall system.

These peripherals are able to, along with the hub, achieve new utilities. For example, the hub might be able to detect abnormal biometric conditions using the biometric sensors (e.g., dehydration, abnormally low heart rate) and couple this information with readings from the gas-detection system (e.g., a reading reflecting the presence of hydrogen sulfide gas) to reach a conclusion that the person needs to immediately get to safety. In order to communicate that to the person, the system could use numerous means to communicate the information to the wearer. The smart badge might also include a vibration warning system which could warn the employee by vibration. Or the badge could use the speaker or Bluetooth peripherals as discussed above.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and sub-combinations are of utility and may be employed without reference to other features and sub-combinations and are contemplated within the scope of the claims. Not all steps listed in the various figures need be carried out in the specific order described.

What is claimed is:

1. A system for monitoring employees of an organization, the system comprising:
a wearable device including: (i) a controller having a non-transitory memory for storing software and a processor for executing software instructions; (ii) a first wireless communication component capable of wirelessly connecting the controller with a cloud-based service acting as a platform between the wearable device and at least one software system utilized by the organization; (iii) a display screen for displaying images and text stored in the memory; (iv) a user-input device for receiving input and transmitting the input to the controller; (v) a position tracking device for continuously tracking a location of the wearable device; and (vi) a battery for providing electrical power to the controller, the wireless communication component, the display screen, the user-input device, and the position tracking device;
the controller being configured to: (i) continuously monitor location data received from the position tracking device; (ii) store the location data either locally or remotely; (ii) interface through a hub with the at least one software system utilized by the organization; (iii) communicate the location data to the at least one software system utilized by the organization for a business-related objective; (iv) be included in a private LTE network; and (v) continually interface through the hub over the private LTE network such that at least one software system utilized by the organization is able to track an employee condition.

2. The system of claim 1 wherein the cloud-based service acts as a platform between the wearable device and at least one software system utilized by the organization.

3. The system of claim 1 wherein the cloud-based service enables communications between the controller and a plurality of software systems utilized by the organization.

4. The system of claim 3 wherein the plurality of software systems utilized by the organization include at least two of a scheduling system, a field data management system, a risk based inspection system, and a human resources software system.

5. The system of claim 1 wherein the position tracking component utilizes GNSS.

6. The system of claim 5 wherein the GNSS is GPS.

7. The system of claim 1 wherein the wearable device includes a position estimating component, the controller using reading received from the position estimating component to estimate real-time locations between position readings received from the position tracking component.

8. The system of claim 7 wherein the position estimating component is a dead-reckoning device.

9. The system of claim 7 wherein the wearable device includes a barometer, the controller receiving readings from the barometer to contribute to a height determination for the wearable device.

10. The system of claim 1 wherein the wireless communication component is configured for operation on bands in a range of from 700 MHz up to 2.7 GHz, and operating in either TDD or FDD.

11. The system of claim 1 wherein the wireless communication component is configured for use in either a 4G or 5G network.

12. The system of claim 1 wherein the wireless communication component is configured to operate in a Band 48 CBRS private network in a range from 3550 MHz to 3700 MHz.

13. The system of claim 1 wherein the wireless communication component is configured to operate in the ISM radio bands.

14. The system of claim 1 wherein the wearable device is incorporated into a wireless network established using an edge router connected into one of a backhaul or a satellite source of internet.

15. The system of claim 14 wherein the edge router is a Band 48 edge kit.

16. The system of claim 14 wherein the edge router communicates through at least one MBO antenna.

17. The system of claim 14 wherein the edge router is located on a vehicle.

18. The system of claim 1 wherein the controller is configured to receive readings from a gas sensor which can be utilized by the at least one software system utilized by the organization.

19. The system of claim 1 wherein the controller is configured to receive readings from a biometric sensor which can be utilized by the at least one software system utilized by the organization.

20. The system of claim 1 wherein the wearable device includes front and back cameras and at least one microphone.

21. The system of claim 1 wherein the wearable device includes a distinctive coloring making the device identifiable as a device owned or operated by an organization.

22. The system of claim 21 wherein the distinctive coloring exists about the edges of the device.

23. The system of claim 1 wherein the wearable device includes a second wireless network component operated in a LPWAN.

24. The system of claim 23 wherein the LPWAN is a LoRa network.

25. The system of claim 23 wherein the controller is configured to enter the wearable device into a power save mode by shutting down: (i) the first wireless network component, (ii) a display, and (iii) a plurality of other power-consuming devices upon a detection of a power level dropping below a predetermined minimum; and then maintaining operation of the second wireless network component.

26. A device for use in a system for tracking workers at a facility comprising:
a processing component;
a memory component;
a position tracking component for continuously tracking a series of locations of the device;
a position estimating component for estimating position between the series of locations;
a first wireless communication component configured to operate in a private wireless network;
a processing component configured to operate with at least one external gas sensor, the processing component configured to transmit information detected by the gas sensor wirelessly using the first wireless communication component;
a cloud-based service acting as a platform between the device and an organization dedicated software system, the service acting as a hub between the device and the organization dedicated software system the cloud-based system configured to transmit and utilize data received from the gas sensor for the purpose of employee safety.

27. The device of claim 26 wherein wireless communication component is configured to operate in a Band 48 CBRS private network in a range from 3550 MHz to 3700 MHz.

28. The system of claim 26 wherein the position tracking component utilizes GNSS.

29. The system of claim 26 comprising:
a biometric sensor on the device configured to monitor an employee health condition indicative of danger.

30. The system of claim 29 wherein the processing component is configured to transmit data regarding the health condition through the hub to the organization dedicated software system.

31. The system of claim 29 wherein the system is further configured to evaluate the data regarding the health condition along with the information detected by the gas sensor and initiate an alert to the device to warn an employee of a dangerous condition.

32. A wearable device for monitoring employees, the device comprising:
a wireless communication component configured to use TDD as a duplex mode, the wireless communication component being capable of wirelessly connecting a controller with a cloud-based service acting as a platform between the wearable device and one or more software systems utilized by an organization;
a display screen for displaying images and text stored in a memory located in the device;
a user-input device for receiving input and transmitting the input to the controller;
a position tracking device for continuously tracking a location of the wearable device;
a battery for providing electrical power to the controller, the wireless communication device, the display screen, the user-input device, and the position tracking device; and
the controller being configured to: (i) continuously monitor location data received from the position tracking device; (ii) store the location data either locally or remotely; (ii) interface through a hub with a plurality of facility-related software systems; (iii) communicate the location data to at least one software system utilized by the organization for a business-related objective; (iv) send and receive communications in a private network; and (v) interface with the one or more software systems through the hub.

* * * * *